United States Patent
Chiang et al.

(10) Patent No.: US 10,884,318 B2
(45) Date of Patent: Jan. 5, 2021

(54) CAMERA MODULE

(71) Applicant: Spring Rainbow Optics Co., LTD, Taoyuan (TW)

(72) Inventors: Po-Liang Chiang, Taipei (TW); Yu-Teng Jheng, Changhua County (TW)

(73) Assignee: SPRING RAINBOW OPTICS CO., LTD, Taoyuan (TW)

( * ) Notice: Subject to any disclaimer, the term of this patent is extended or adjusted under 35 U.S.C. 154(b) by 217 days.

(21) Appl. No.: 16/109,916

(22) Filed: Aug. 23, 2018

(65) Prior Publication Data
US 2019/0064634 A1    Feb. 28, 2019

Related U.S. Application Data

(60) Provisional application No. 62/549,974, filed on Aug. 25, 2017.

(51) Int. Cl.
| | |
|---|---|
| *G02B 7/04* | (2006.01) |
| *G02B 3/14* | (2006.01) |
| *G02B 7/08* | (2006.01) |
| *G02B 13/24* | (2006.01) |
| *G03B 13/34* | (2006.01) |
| *G02B 3/12* | (2006.01) |
| *G03B 17/12* | (2006.01) |

(52) U.S. Cl.
CPC .............. *G03B 13/34* (2013.01); *G02B 3/12* (2013.01); *G02B 3/14* (2013.01); *G02B 7/04* (2013.01); *G02B 7/08* (2013.01); *G02B 13/24* (2013.01); *G03B 17/12* (2013.01)

(58) Field of Classification Search
CPC . G02B 7/00; G02B 7/02; G02B 7/021; G02B 7/023; G02B 7/025; G02B 7/04; G02B 13/00; G02B 13/001; G02B 13/009; G02B 15/00; G02B 15/02; G02B 15/04; G02B 15/06; G02B 1/00; G02B 1/06; G02B 3/12
See application file for complete search history.

(56) References Cited

U.S. PATENT DOCUMENTS

| | | | | |
|---|---|---|---|---|
| 2010/0232161 | A1* | 9/2010 | Aschwanden | G02B 7/182 362/278 |
| 2016/0216476 | A1* | 7/2016 | Lee | G02B 7/08 |
| 2017/0322478 | A1* | 11/2017 | Bolis | G02B 3/14 |

* cited by examiner

*Primary Examiner* — Robert E. Tallman
(74) *Attorney, Agent, or Firm* — WPAT, PC

(57) ABSTRACT

A camera module includes a lens assembly, a propulsion device, and a deformable. The propulsion device is configured for distally and proximally driving the lens assembly. The deformable lens is deformed, and a focal length of the deformable lens is changed in response to a pressure applied onto the deformable lens by the lens assembly distally driven by the propulsion device. The deformable lens remains undeformed, and the focal length of the deformable lens remains constant in response to no pressure applied onto the deformable lens.

20 Claims, 5 Drawing Sheets

(1) Object is at a long distance : C=∞

(2) Object is at a medium distance : C=∞

(3) Object is at an extreme close distance : C≠∞

CAMERA MODULE

CROSS REFERENCE TO RELATED APPLICATIONS

The present application claims the benefit of priority under 35 USC 119(e) of U.S. Provisional Patent Application No. 62/549,974 entitled "IMAGE CAPTURING MODULE" and filed on Aug. 25, 2017, the contents of which are incorporated herein by reference in their entirety.

FIELD OF THE INVENTION

The present disclosure relates to the technical field of cameras, and particularly to a camera module for extreme close-up photography, or known as macro photography.

BACKGROUND OF DISCLOSURE

In a conventional focusing method for a camera module of a general portable device (such as a mobile phone, a panel, etc), a voice coil motor 30 (VCM) is generally used for driving the lens back and forth to achieve a position to focus on a target object 2. According to the thin lens equation:

$$\frac{1}{p} + \frac{1}{q} = \frac{1}{f},$$

when the object 2 is close to the lens 10, the distance between the lens 10 and the image sensor 40 is increased for achieving the optimal focus. However, if the object 2 is photographed at an extreme close-up distance from the camera 1 (for example, less than 10 cm), due to the track limitation of the voice coil motor 30, the displacement of the lens 10 is insufficient to clearly focus, as shown in FIG. 1.

Therefore, it is necessary to provide a camera module for solving the problem of the prior art.

SUMMARY OF INVENTION

A primary object of the present disclosure is to provide a camera module for extreme close-up photography, or known as macro photography.

A camera module is provided in an embodiment of the present disclosure, and includes:

a lens assembly including:

a rigid lens configured for forming an optical image of an object, and a barrel disposed around the rigid lens;

a propulsion device disposed around the lens assembly and configured for distally and proximally driving the lens assembly; and a deformable lens positioned distally to the lens assembly, wherein the deformable lens is deformed, and a focal length of the deformable lens is changed in response to a pressure applied onto the deformable lens by the lens assembly distally driven by the propulsion device; the deformable lens remains undeformed, and the focal length of the deformable lens remains constant in response to no pressure applied onto the deformable lens.

In accordance with an embodiment of the present disclosure, the deformable lens comprises a liquid lens including a rigid transparent film and an elastic transparent film, both of which together form a cavity containing a liquid, wherein the cavity has a fixed volume, and the liquid has a refractive index.

In accordance with a further embodiment of the present disclosure, a curvature of the elastic transparent film and a focal length of the liquid lens are changed in response to a pressure applied onto the elastic transparent film by the lens assembly distally driven by the propulsion device, and the curvature of the elastic transparent film and the focal length of the liquid lens remain constant in response to no pressure applied onto the liquid lens.

In accordance with an embodiment of the present disclosure, the barrel includes:

a mechanical structure disposed at a distal end of the barrel and around the rigid lens, and configured for contacting the deformable lens; and a lateral structure disposed on a lateral side of the barrel, and configured for contacting the propulsion device.

In accordance with a further embodiment of the present disclosure, the deformable lens is deformed, and the focal length of the deformable lens is changed in response to a pressure applied onto the deformable lens by a contact between the mechanical structure and the deformable lens.

In accordance with a further embodiment of the present disclosure, the mechanical structure is in a shape of an annular protrusion, and a center of the annular protrusion is aligned with an optical axis of the rigid lens In accordance with a further embodiment of the present disclosure, the mechanical structure is symmetrically arranged around the rigid lens, and a center of the mechanical structure is aligned with an optical axis of the rigid lens.

In accordance with a further embodiment of the present disclosure, the mechanical structure is integrated with a distal part of the lens assembly.

In accordance with another embodiment of the present disclosure, the rigid lens includes a mechanical structure disposed on a circumference of the rigid lens, and configured for contacting the deformable lens.

In accordance with an embodiment of the present disclosure, the propulsion device comprises a voice coil motor.

In accordance with an embodiment of the present disclosure, the camera module further comprises an image sensor positioned proximally to the lens assembly, wherein the optical image of the object is in focus and formed on the image sensor by a compound lens formed by the deformable lens and the rigid lens.

In accordance with a further embodiment of the present disclosure, a distance between a distal end of the mechanical structure and a proximal surface of the deformable lens is defined as L, a distance between a center of a distal surface of the rigid lens and the proximal surface of the deformable lens is defined as d, and (d−L)<0.5 mm.

In accordance with a further embodiment of the present disclosure, a radius of a light transmitting portion of the lens assembly is R0, a radius of an inner circumference of the mechanical structure is R1, a radius of an outer circumference of the mechanical structure is R3, an average of R1 and R3 is R2, a radius of an distal end of the lens assembly is R4, and R0<R1<R2<R3≤R4.

In accordance with a further embodiment of the present disclosure, (R3−R1)≤0.30 mm.

In accordance with a further embodiment of the present disclosure, 0.65 mm≤R2.

A camera module is provided in an embodiment of the present disclosure, and includes:

a lens assembly including:
a rigid lens configured for forming an optical image of an object, and
a barrel disposed around the rigid lens;
a propulsion device disposed around the lens assembly and configured for distally and proximally driving the lens assembly; and
a deformable lens positioned distally to the lens assembly, wherein the deformable lens is deformed into a convex lens in response to a contact between the lens assembly and the deformable lens; the deformable lens remains to be a flat lens in response to no contact between the lens assembly and the deformable lens.

In accordance with an embodiment of the present disclosure, the deformable lens comprises a liquid lens including a rigid transparent film and an elastic transparent film, both of which together form a cavity containing a liquid, wherein the cavity has a fixed volume, and the liquid has a refractive index.

In accordance with an embodiment of the present disclosure, the barrel includes:

a mechanical structure disposed at a distal end of the barrel and around the rigid lens, and configured for contacting the deformable lens; and
a lateral structure disposed on a lateral side of the barrel, and configured for contacting the propulsion device.

A camera module is provided in an embodiment of the present disclosure, and includes:

a lens assembly including:
a rigid lens configured for forming an optical image of an object, and
a barrel disposed around the rigid lens;
a propulsion device disposed around the lens assembly and configured for distally and proximally driving the lens assembly; and
a deformable lens positioned distally to the lens assembly, wherein the deformable lens is deformed into a convex lens in a compound focusing configuration where the lens assembly and the deformable lens contact each other; the deformable lens remains to be a flat lens in a simple focusing configuration where the lens assembly and the deformable lens do not contact each other.

In accordance with an embodiment of the present disclosure, the deformable lens comprises a liquid lens including a rigid transparent film and an elastic transparent film, both of which together form a cavity containing a liquid, wherein the cavity has a fixed volume, and the liquid has a refractive index.

In accordance with an embodiment of the present disclosure, the barrel includes:

a mechanical structure disposed at a distal end of the barrel and around the rigid lens, and configured for contacting the deformable lens; and
a lateral structure disposed on a lateral side of the barrel, and configured for contacting the propulsion device.

In the camera module in accordance with the present disclosure, a deformable lens is disposed distally to the lens assembly for extreme close-up photography. When the lens assembly distally driven by the propulsion device contacts the deformable lens and applies a pressure onto the deformable lens, the deformable lens is deformed, a focal length of the deformable lens is changed, and the lens assembly in combination with the deformable lens forms the optical image of the object, which is at a close-up distance away from the camera module, on the image sensor. When the lens assembly does not contact the deformable lens and applies no pressure onto the deformable lens, the deformable lens remains undeformed, a focal length of the deformable lens remains constant, and the lens assembly forms the optical image of the object, which is at a medium or long distance away from the camera module, on the image sensor. Thus, the camera module achieves extreme close-up photography without being limited by the structure of the propulsion device.

Moreover, in the camera module in accordance with the present disclosure, the lens assembly is utilized to apply a pressure onto the deformable lens in a direction being parallel to the displacement direction of the lens assembly, without disposing an additional member for deforming the deformable lens, thereby reducing the costs and simplifying the manufacturing process.

BRIEF DESCRIPTION OF DRAWINGS

The foregoing aspects and many of the attendant advantages of this disclosure will become more readily appreciated as the same becomes better understood by reference to the following detailed description, when taken in conjunction with the accompanying drawings, wherein.

DETAILED DESCRIPTION OF PREFERRED EMBODIMENTS

Figure 1:
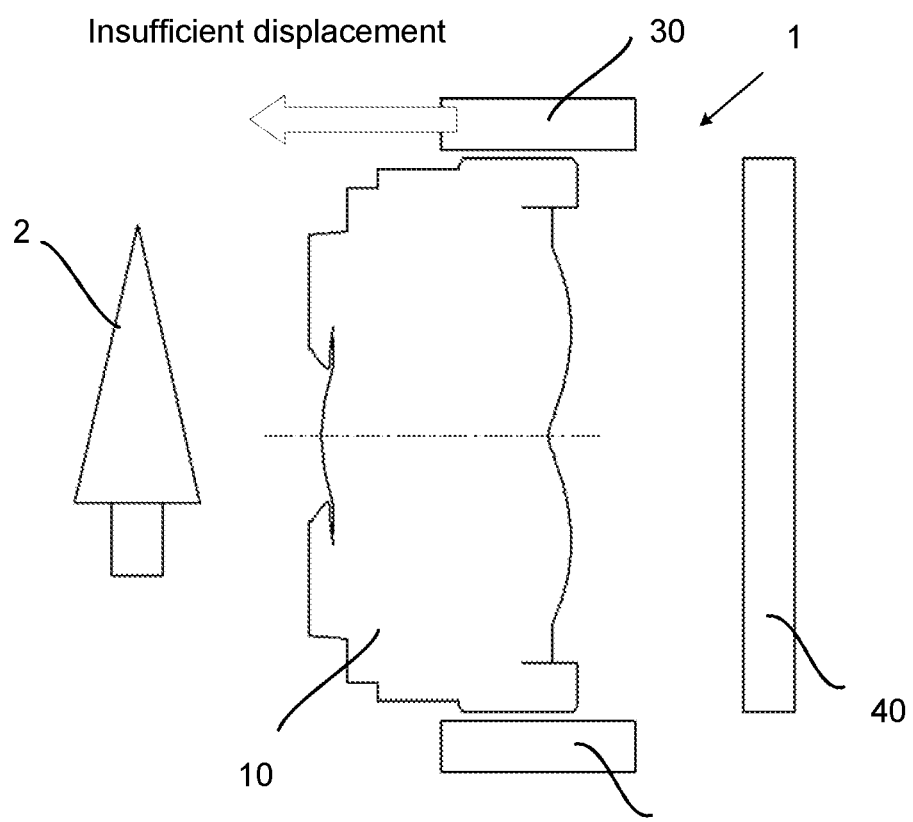
FIG. 1 is a side view illustrating a camera module of a general portable device in a prior art.

The following description of the embodiments with reference to the accompanying drawings is used to illustrate particular embodiments of the present disclosure. The directional terms used in the present disclosure, such as "upper", "lower", "front", "back", "left", "right", "inner", "outer", "side surface", etc., are only directions with regard to the accompanying drawings. Therefore, the directional terms used for describing and illustrating the present disclosure are not intended to limit the present disclosure.

In the drawings, units with similar structures are indicated by the same reference number.

As to an "embodiment" mentioned herein, the particular features, structures, or characteristics described in this embodiment, which may be described in combination with the embodiment, may be included in at least one embodiment of the present disclosure. The phrases appearing at various locations in the specification do not necessarily refer to the same embodiments, nor to the embodiments being alternative to, mutually exclusive with, or independent from other embodiments. It is explicitly and implicitly understood by a person of ordinary skill in the art that the embodiments described herein may be combined with other embodiments.

The content of the present disclosure is described in detail by reference to embodiments below in conjunction with the accompanying drawings.

Figure 2:
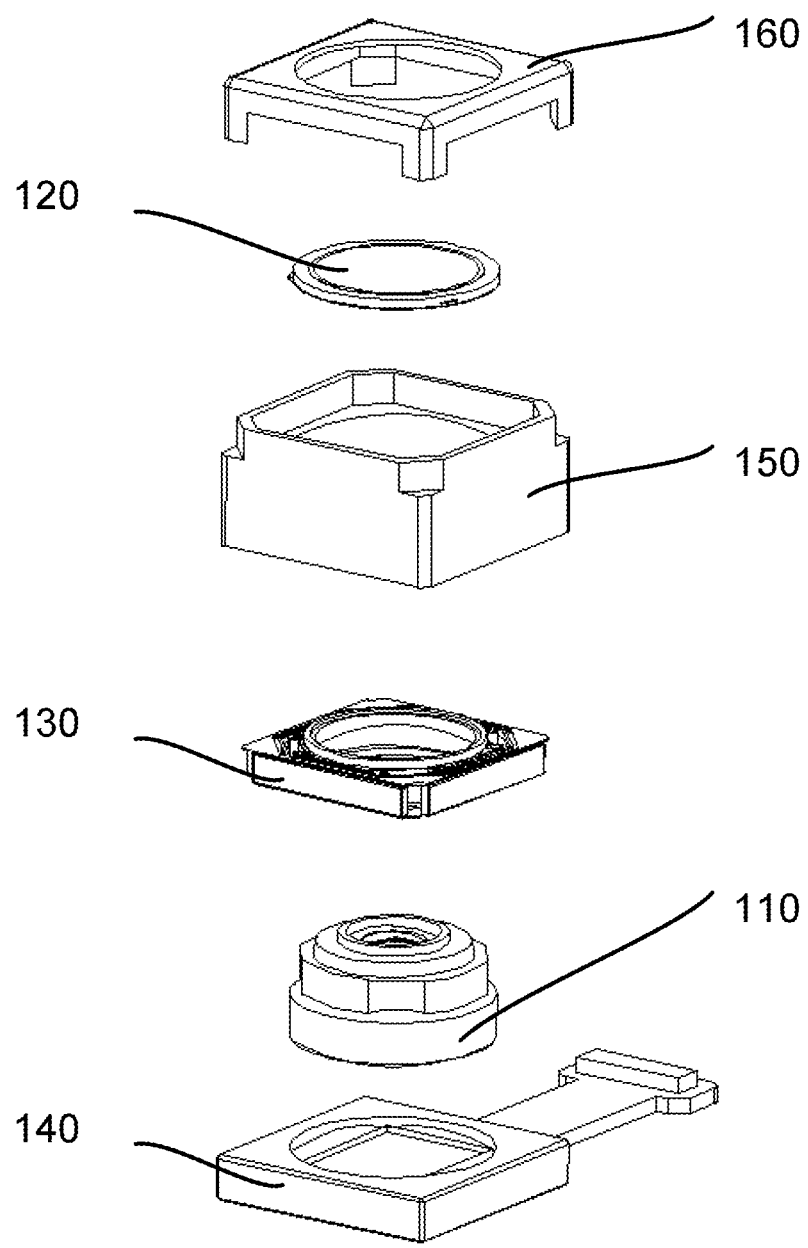
FIG. 2 is an exploded view illustrating a camera module in accordance with an embodiment of the present disclosure.

By reference to the accompanying drawings, the technological content and embodiments of the present disclosure are described in detail as follows:

Refer to FIG. 2, which is a exploded view illustrating a camera module in accordance with an embodiment of the present disclosure.

In an embodiment of the present disclosure, a camera module 3 is provided and includes a lens assembly 110, a propulsion device 130, and a deformable lens 120. In a preferable embodiment, the camera module 3 further includes an image sensor 140, a housing 150 and a top cover 160 for protection of the parts inside the camera module 3.

The top cover 160 and the deformable lens 120 may be combined into a first component by a coupling recess and then fixed by dispensing glue thereon. The housing 150, the propulsion device 130 and the lens assembly 110 may be combined into a second component, and the housing 150 and the propulsion device 130 may be combined by a coupling recess and then fixed by dispensing glue thereon. The propulsion device 130 and the lens assembly 110 may be combined by a lock means or a coupling recess and then fixed by dispensing glue thereon. The second component may additionally include an image sensor, and the second component and the image sensor may be fixed by dispensing glue thereon. Finally, the first component and the second component may be combined by a coupling recess and then fixed by dispensing glue thereon, and configured for forming a space between the liquid lens and the lens. However, the above processes for assembling the components of the camera module 3 are only examples, and should not be regarded as limiting.

Figure 3:
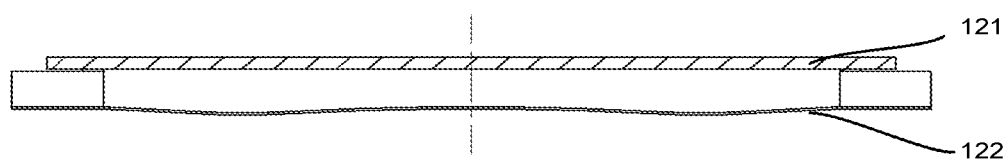
FIG. 3 is a side view illustrating a deformable lens in accordance with an embodiment of the present disclosure.

Refer to FIG. 3, which is a side view illustrating a deformable lens in accordance with an embodiment of the present disclosure.

The deformable lens 120 is positioned distally to the lens assembly 110 for achieving extreme close-up photography. The technical key is to clearly photograph at an extreme close-up distance from the camera module, and also maintain the image quality at a normal distance, without interfering the image quality by the deformable lens 120. Therefore, how to select a suitable deformable lens 120, to control the deformable lens deformation, and to construct the camera module 3 influences and determines the image quality.

In the embodiment of the present disclosure, the deformable lens 120 may be a liquid lens 120. As shown in FIG. 3, the liquid lens 120 includes a rigid transparent film 121 (usually made of glass or quartz) on one side of the liquid lens, and an elastic transparent film 122 on the opposite side of the liquid lens 120. Both of the rigid transparent film 121 and the elastic transparent film 122 together form a cavity containing a liquid, wherein the cavity has a fixed volume, and the liquid has a refractive index. The rigid transparent film 121 distally faces an object 2, and the elastic transparent film 122 proximally faces the lens assembly 110. When the elastic transparent film 122 is pressed, the curvature and the focal length of the liquid lens 120 are changed.

Figure 4:
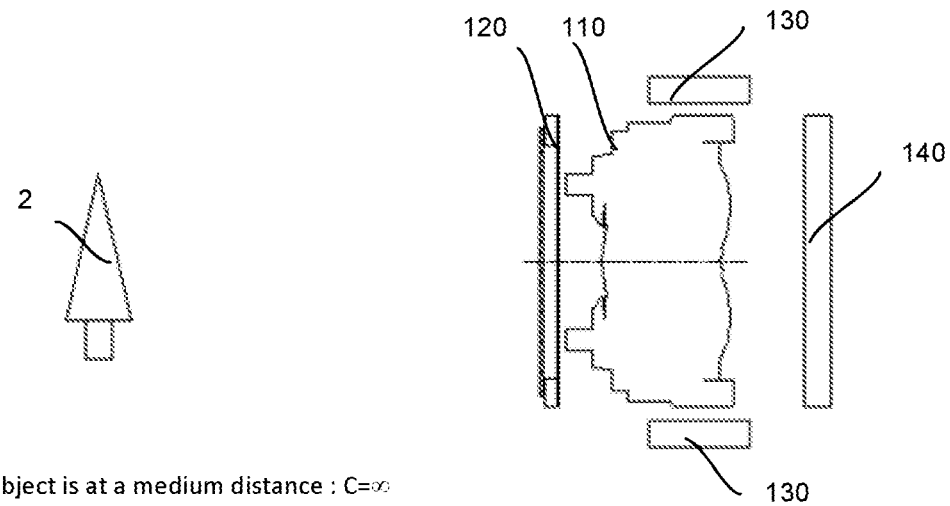
FIG. 4 is a side view illustrating the relative relationship of an object, a lens assembly, a deformable lens, and an image sensor in accordance with an embodiment of the present disclosure.
Figure 4:
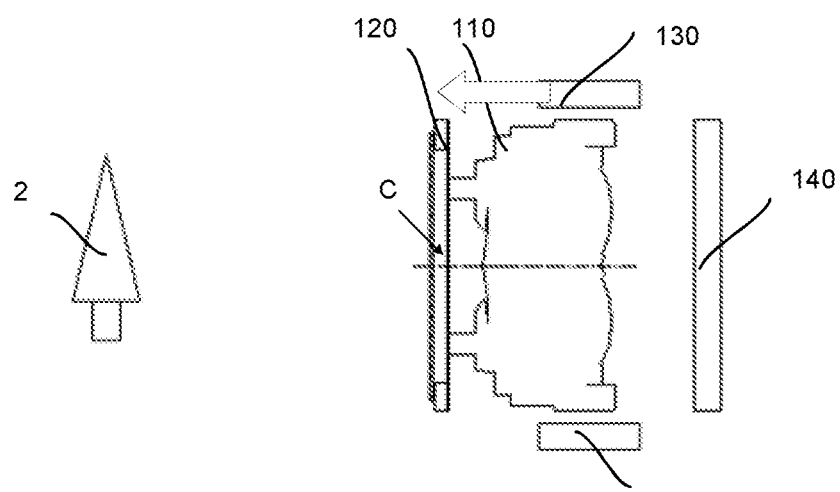
Figure 4:
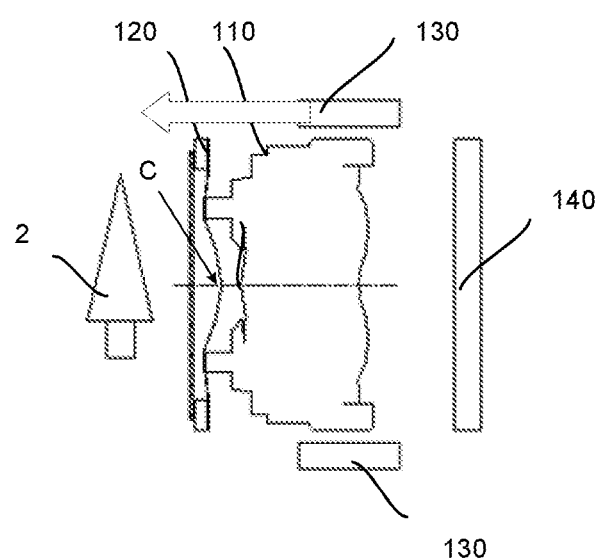

Refer to FIG. 4, which is a side view illustrating the relative relationship of an object, a lens assembly, a deformable lens, and an image sensor in accordance with an embodiment of the present disclosure As shown in FIG. 4, a dual-configuration focusing method can be achieved by the deformable lens 120 and the lens assembly 110 in the camera module 3 shown in FIG. 2, wherein the dual-configuration focusing method includes a compound focusing configuration and a simple focusing configuration, as explained below. First, a mechanical structure 111 is disposed on the distal end of the lens assembly 110 for contacting the deformable lens 120. When the object 2 is at a long distance or a medium distance away from the camera module 3, the propulsion device 130 moves the lens assembly 110 to adjust the focal length, but the mechanical structure 111 does not contact the deformable lens 120. The shape of the deformable lens 120 is similar to a flat glass at this time, and the image is not affected by the deformable lens 120. This configuration is defined as the simple focusing configuration. When the object 2 is at a short distance away from the camera module 3, the propulsion device 130 moves the lens assembly 110 to adjust the focal length, the mechanical structure 111 contacts and applies a pressure onto the deformable lens 120 in a direction being parallel to the displacement direction of the lens assembly 110, and the deformable lens 120 is deformed into a convex lens, and, in combination with the rigid lens, focuses on the object 2. The optical image of the object 2 is in focus and formed on the image sensor 140 by a compound lens formed by the deformable lens 120 and the rigid lens. This configuration is defined as the compound focusing configuration.

In an embodiment of the present disclosure, the deformable lens 120 is deformed, and a focal length of the deformable lens 120 is changed in response to a pressure applied onto the deformable lens 120 by the lens assembly 110 distally driven by the propulsion device 130; the deformable lens 120 remains undeformed, and the focal length of the deformable lens 120 remains constant in response to no pressure applied onto the deformable lens 120. In this embodiment, the deformable lens 120 may be a flat lens or a convex lens before the deformation.

In an embodiment of the present disclosure, the deformable lens 120 is deformed, and a focal length of the deformable lens 120 is changed in response to a contact between the lens assembly 110 and the deformable lens 120; the deformable lens 120 remains undeformed, and the focal length of the deformable lens 120 remains constant in response to no contact between the lens assembly 110 and the deformable lens 120. In this embodiment, the deformable lens 120 may be a flat lens or a convex lens before the deformation.

In an embodiment of the present disclosure, the deformable lens 120 is deformed, and a focal length of the deformable lens 120 is changed in a compound focusing configuration where the lens assembly 110 and the deformable lens 120 contact each other; the deformable lens 120 remains undeformed, and the focal length of the deformable lens 120 remains constant in a simple focusing configuration where the lens assembly 110 and the deformable lens 120 do not contact each other. In this embodiment, the deformable lens 120 may be a flat lens or a convex lens before the deformation.

In a further embodiment of the present disclosure, the deformable lens 120 is deformed into a convex lens in response to a pressure applied onto the deformable lens 120 by the lens assembly 110 distally driven by the propulsion device 130; the deformable lens 120 remains to be a flat lens in response to no pressure applied onto the deformable lens 120.

In a further embodiment of the present disclosure, the deformable lens 120 is deformed into a convex lens in response to a contact between the lens assembly 110 and the deformable lens 120; the deformable lens 120 remains to be a flat lens in response to no contact between the lens assembly 110 and the deformable lens 120.

In a further embodiment of the present disclosure, the deformable lens 120 is deformed into a convex lens in a compound focusing configuration where the lens assembly 110 and the deformable lens 120 contact each other; the deformable lens 120 remains to be a flat lens in a simple focusing configuration where the lens assembly 110 and the deformable lens 120 do not contact each other.

In another embodiment of the present disclosure, a curvature of the elastic transparent film 122 and a focal length of the liquid lens 120 are changed in response to a pressure applied onto the elastic transparent film 122 by the lens assembly 110 distally driven by the propulsion device 130; the curvature of the elastic transparent film 122 and the focal length of the liquid lens 120 remain constant in response to no pressure applied onto the elastic transparent film 122.

In another embodiment of the present disclosure, a curvature of the elastic transparent film 122 and a focal length of the liquid lens 120 are changed in response to a contact between the lens assembly 110 and the elastic transparent film 122; the curvature of the elastic transparent film 122 and the focal length of the liquid lens 120 remain constant in response to no contact between the lens assembly 110 and the elastic transparent film 122.

In another embodiment of the present disclosure, a curvature of the elastic transparent film 122 and a focal length of the liquid lens 120 are changed lens in a compound focusing configuration where the lens assembly 110 and the elastic transparent film 122 contact each other; the curvature of the elastic transparent film 122 and the focal length of the liquid lens 120 remain constant lens in a simple focusing configuration where the lens assembly 110 and the elastic transparent film 122 do not contact each other.

Figure 5:
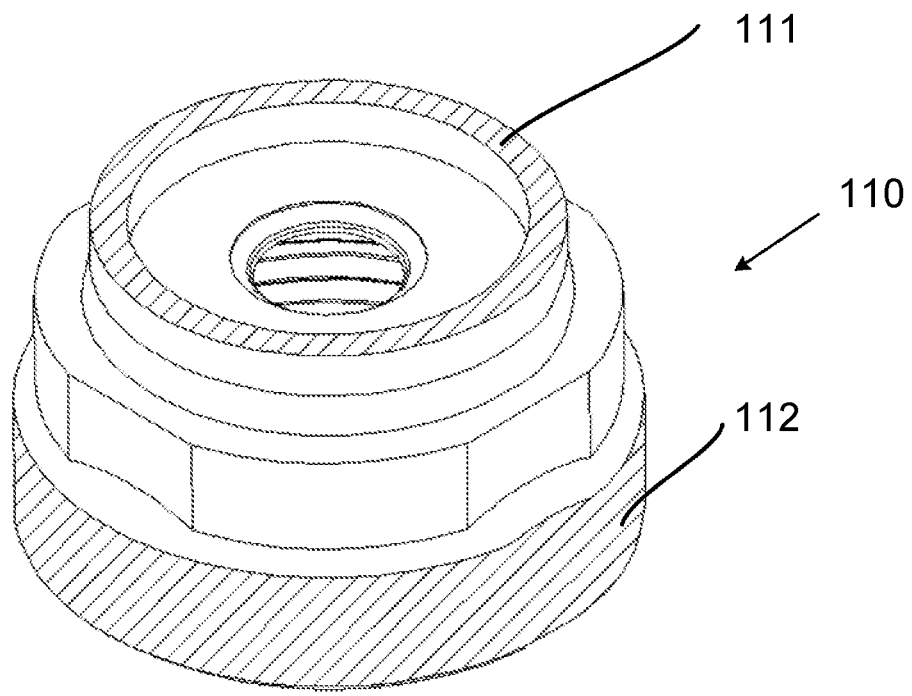
FIG. 5 is a structural schematic diagram illustrating a mechanical structure and a lateral structure in accordance with an embodiment of the present disclosure.

Refer to FIG. 5, which is a structural schematic diagram illustrating a mechanical structure and a lateral structure in accordance with an embodiment of the present disclosure.

The lens assembly 110 includes a rigid lens configured for forming an optical image of an object 2, and a barrel disposed around the rigid lens. The rigid lens may be made of plastic or glass, and may be a specific compound lens structure, such as a combination of four, five, six lenses and the like. The barrel includes a mechanical structure 111 disposed at a distal end of the barrel and around the rigid lens, and configured for contacting the deformable lens 120. The mechanical structure 111 is in a shape of an annular protrusion, and a center of the annular protrusion is aligned with an optical axis of the rigid lens. The barrel also includes a lateral structure 112 disposed on a lateral side of the barrel, and configured for contacting the propulsion device 130.

In another embodiment of the present disclosure, the deformable lens 120 is deformed, and the focal length of the deformable lens 120 is changed in response to a pressure applied onto the deformable lens 120 by a contact between the mechanical structure 111 and the deformable lens 120; the deformable lens 120 remains undeformed, and the focal length of the deformable lens 120 remains constant in response to no pressure applied onto the deformable lens 120. In this embodiment, the deformable lens 120 may be a flat lens or a convex lens before the deformation.

In another embodiment of the present disclosure, the deformable lens 120 is deformed, and a focal length of the deformable lens 120 is changed in a compound focusing configuration where the mechanical structure 111 and the deformable lens 120 contact each other; the deformable lens 120 remains undeformed, and the focal length of the deformable lens 120 remains constant in a simple focusing configuration where the mechanical structure 111 and the deformable lens 120 do not contact each other. In this embodiment, the deformable lens 120 may be a flat lens or a convex lens before the deformation.

In a further embodiment of the present disclosure, the deformable lens 120 is deformed into a convex lens in response to a pressure applied onto the deformable lens 120 by a contact between the mechanical structure 111 and the deformable lens 120; the deformable lens 120 remains to be a flat lens in response to no pressure applied onto the deformable lens 120.

In a further embodiment of the present disclosure, the deformable lens 120 is deformed into a convex lens in a compound focusing configuration where the mechanical structure 111 and the deformable lens 120 contact each other; the deformable lens 120 remains to be a flat lens in a simple focusing configuration where the mechanical structure 111 and the deformable lens 120 do not contact each other.

In a further embodiment of the present disclosure, a curvature of the elastic transparent film 122 and a focal length of the liquid lens 120 are changed in response to a pressure applied onto the elastic transparent film 122 by a contact between the mechanical structure 111 and the elastic transparent film 122; the curvature of the elastic transparent film 122 and the focal length of the liquid lens 120 remain constant in response to no pressure applied onto the elastic transparent film 122.

In a further embodiment of the present disclosure, a curvature of the elastic transparent film 122 and a focal length of the liquid lens 120 are changed in a compound focusing configuration where the mechanical structure 111 and the elastic transparent film 122 contact each other; the curvature of the elastic transparent film 122 and the focal length of the liquid lens 120 remain constant in a simple focusing configuration where the mechanical structure 111 and the elastic transparent film 122 do not contact each other.

Figure 6:
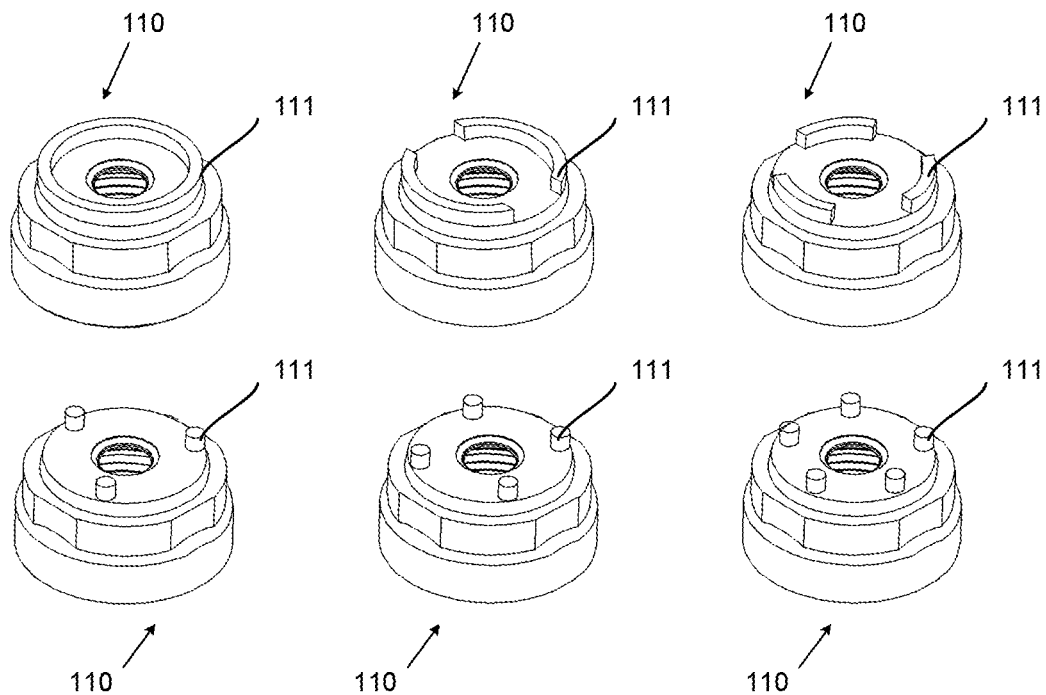
FIG. 6 is a structural schematic diagram illustrating examples of the mechanical structure in accordance with an embodiment of the present disclosure.

Refer to FIG. 6, which is a structural schematic diagram illustrating examples of the mechanical structure in accordance with an embodiment of the present disclosure.

As shown in FIG. 6, furthermore, the mechanical structure 111 may be one or more elevated blocks or one or more elevated columns symmetrically arranged around the rigid lens, and has a symmetrical shape centered on the optical axis of the rigid lens. Preferably, the number of the elevated blocks is not limited, and the number of the elevated columns may be 3 or more. The mechanical structure 111 may be made of metal, plastic or glass, which may be integrated with a distal part of the lens assembly 110 itself or additionally assembled onto the lens assembly 110. For example, the mechanical structure 111 may be plastic integrated pieces and may be presented in elevated column shapes. In terms of the profile shape of the mechanical structure, the mechanical structure may be small platforms or convex bumps with curvatures. However, the shapes of the mechanical structure are only examples, and should not be regarded as limiting.

In another embodiment of the present disclosure, the rigid lens includes a mechanical structure 111 disposed on a circumference of the rigid lens, configured for contacting the deformable lens 120, and having a similar function to the mechanical structure 111 disposed on the barrel.

Figure 7:
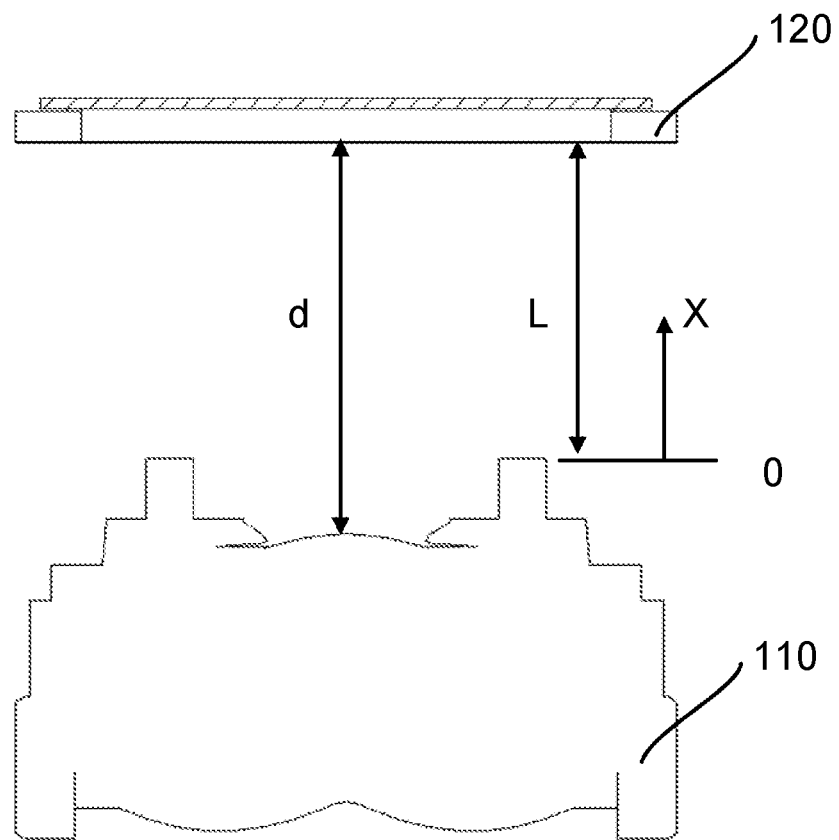
FIG. 7 is a side view illustrating the relative distance between a lens assembly and a deformable lens in accordance with an embodiment of the present disclosure.

Refer to FIG. 7, which is a side view illustrating the relative distance between a lens assembly and a deformable lens in accordance with an embodiment of the present disclosure.

As shown in FIG. 7, the physical structure and the spatial relationship between the deformable lens 120 and the lens assembly 110 are further defined. When an object 2 is at an infinite distance, in order to focus on the object 2, the position of the reference plane of the mechanical structure 111 of the lens assembly 110 is set to zero (0) at this time. The distance between a distal end of the mechanical structure 111 and the proximal surface of the deformable lens 120 is L. When the mechanical structure 111 of the lens assembly 110 is at the position of zero (0), and the lens assembly 110 is distally driven by the propulsion device 130 until the lens assembly 110 contacts the surface of the deformable lens 120 (the deformable lens 120 is not deformed by the lens assembly 110 at this time), L is the entire moving distance. Preferably, L≤0.25 mm. After the lens assembly 110 is in contact with the deformable lens 120, the lens assembly 110 continues to move forward to deform the deformable lens 120, and focuses on the object at a close-up distance from the camera module 3.

When the object 2 is at a distance of 0.1 m (10 cm) from the camera module 3, it is preferably required for the lens assembly 110 to move a distance of X from the position of zero (0) for focusing on the object 2, and the relationship between X and L is 0.2 L≤X≤0.8 L. In addition, in order to prevent the deformable lens 120 from colliding with the rigid lens of the lens assembly 110 after the deformation, if the distance from the center of the distal surface of the rigid lens (the outer surface of the outmost rigid lens of the multiple rigid lenses in the lens assembly) to the proximal surface of the deformable lens 120 is d, preferably (d−L) <0.5 mm. Moreover, when the propulsion device 130 distally moves the lens assembly 110 to the farthest distance d, 0<d<0.6 mm (at this time, it may be assumed that the distance from the object 2 to the camera module 3 is close to zero). However, the relative distances between a lens assembly and a deformable lens are only examples, and should not be regarded as limiting.

Figure 8:
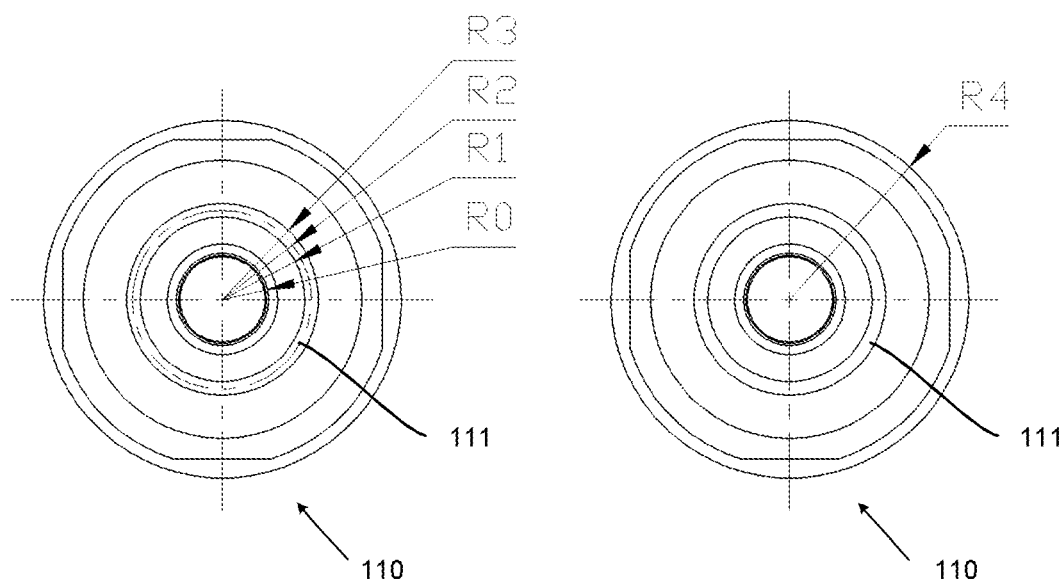
FIG. 8 is a top view illustrating radiuses of a lens assembly and a mechanical structure in accordance with an embodiment of the present disclosure.

Refer to FIG. 8, which is a top view illustrating radiuses of a lens assembly and a mechanical structure in accordance with an embodiment of the present disclosure.

As shown in FIG. 8, from the top view of the lens assembly 110 without the deformable lens 120 on top of the lens assembly 110, when the optical axis of the lens assembly 110 is taken as the center, the radius of the distal end of the lens assembly 110 is R4, the radius of the outer circumference of the mechanical structure 111 for contacting the deformable lens 120 is R3, the radius of the inner circumference of the mechanical structure 111 is R1, and the average of R1 and R3 is R2. The radius of a light transmitting portion of the lens assembly 110 is R0. Therefore, R0<R1<R2<R3≤R4. Preferably, (R3−R1)≤0.30 mm, for preventing the mechanical structure 111 from easily being shrunk during injection molding in the case that the mechanical structure 111 is plastic, and the thickness of the mechanical structure is too thick. In addition, preferably, 0.65 mm≤R2, for preventing the position of the mechanical structure 111 from being too close to the light transmitting portion of the lens assembly 110, and preventing the angle of view of the rigid lens from being blocked and making the image incomplete. However, radiuses of various components are only examples of the lens assembly 110, and should not be regarded as limiting.

The propulsion device 130 is disposed around the lens assembly 110 and configured for distally and proximally driving the lens assembly 110. In some embodiment of the present disclosure, the propulsion device 130 may be a voice coil motor (VCM), an ultrasonic motor, a stepper motor, a memory alloy motor. Preferably, the propulsion devise 130 is a voice coil motor 130. A voice coil motor is a linear motor, and includes a voice coil providing the motive force to a cone by the reaction of a magnetic field to the current passing through the voice coil. In terms of the structure, the voice coil motor may be a shrapnel voice coil motor, a ball voice coil motor, and a friction voice coil motor. In terms of the function, the voice coil motor may be an open loop open motor, a close loop closed loop motor, an alternate mid-mounted motor, and an OIS optical image stabilization motor. However, various types of motors are only examples of the propulsion device 130, and should not be regarded as limiting.

The image sensor 140 is positioned proximally to the lens assembly 110 and configured for receiving the optical image of the object formed by the rigid lens. In some embodiments, the image sensor 140 may be a charged-coupled device (CCD), or a complementary metal-oxide-semiconductor transistor (CMOS). The image sensor 40 is configured to convert light signals into electrical signals. The image sensor 40 is one selected from the group consisting of a ceramic leaded chip carrier package type image sensor, a plastic leaded chip carrier package type image sensor and a chip scale package type image sensor. However, various types of the image sensor 140 are only examples, and should not be regarded as limiting.

In the camera module in accordance with the present disclosure, a deformable lens is disposed distally to the lens assembly for extreme close-up photography. When the lens assembly distally driven by the propulsion device contacts the deformable lens and applies a pressure onto the deformable lens, the deformable lens is deformed, a focal length of the deformable lens is changed, and the lens assembly in combination with the deformable lens forms the optical image of the object, which is at a close-up distance away from the camera module, on the image sensor. When the lens assembly does not contact the deformable lens and applies no pressure onto the deformable lens, the deformable lens remains undeformed, a focal length of the deformable lens remains constant, and the lens assembly forms the optical image of the object, which is at a medium or long distance away from the camera module, on the image sensor. Thus, the camera module achieves extreme close-up photography without being limited by the structure of the propulsion device.

Moreover, in the camera module in accordance with the present disclosure, the lens assembly is utilized to apply a pressure onto the deformable lens in a direction being parallel to the displacement direction of the lens assembly, without disposing an additional member for deforming the deformable lens, thereby reducing the costs and simplifying the manufacturing process.

The present disclosure has been described with a preferred embodiment thereof and it is understood that various modifications, without departing from the spirit of the present disclosure, are in accordance with the embodiments of the present disclosure. Hence, the embodiments described are intended to cover the modifications within the scope and the spirit of the present disclosure, rather than to limit the present disclosure.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is defined in the claims.

What is claimed is:

1. A camera module, comprising:
    a lens assembly including:
        a rigid lens configured for forming an optical image of an object, and
        a barrel disposed around the rigid lens;
    a propulsion device disposed around the lens assembly and configured for distally and proximally driving the lens assembly; and
    a deformable lens positioned distally to the lens assembly, wherein the deformable lens is deformed, and a focal length of the deformable lens is changed in response to a pressure applied onto the deformable lens by the lens assembly distally driven by the propulsion device; the deformable lens remains undeformed, and the focal length of the deformable lens remains constant in response to no pressure applied onto the deformable lens.

2. The camera module as claimed in claim 1, wherein the deformable lens comprises a liquid lens including a rigid transparent film and an elastic transparent film, both of which together form a cavity containing a liquid, wherein the cavity has a fixed volume, and the liquid has a refractive index.

3. The camera module as claimed in claim 2, wherein a curvature of the elastic transparent film and a focal length of the liquid lens are changed in response to a pressure applied onto the elastic transparent film by the lens assembly distally driven by the propulsion device, and the curvature of the elastic transparent film and the focal length of the liquid lens remain constant in response to no pressure applied onto the liquid lens.

4. The camera module as claimed in claim 1, wherein the barrel includes:
    a mechanical structure disposed at a distal end of the barrel and around the rigid lens, and configured for contacting the deformable lens; and
    a lateral structure disposed on a lateral side of the barrel, and configured for contacting the propulsion device.

5. The camera module as claimed in claim 4, wherein the deformable lens is deformed, and the focal length of the deformable lens is changed in response to a pressure applied onto the deformable lens by a contact between the mechanical structure and the deformable lens.

6. The camera module as claimed in claim 4, wherein the mechanical structure is in a shape of an annular protrusion, and a center of the annular protrusion is aligned with an optical axis of the rigid lens.

7. The camera module as claimed in claim 4, wherein the mechanical structure is symmetrically arranged around the rigid lens, and a center of mechanical structure is aligned with an optical axis of the rigid lens.

8. The camera module as claimed in claim 4, wherein the mechanical structure is integrated with a distal part of the lens assembly.

9. The camera module as claimed in claim 1, wherein the propulsion device comprises a voice coil motor.

10. The camera module as claimed in claim 1, further comprising an image sensor positioned proximally to the lens assembly, wherein the optical image of the object is in focus and formed on the image sensor by a compound lens formed by the deformable lens and the rigid lens.

11. The camera module as claimed in claim 4, wherein a distance between a distal end of the mechanical structure and a proximal surface of the deformable lens is defined as L, a distance between a center of a distal surface of the rigid lens and the proximal surface of the deformable lens is defined as d, and (d−L)<0.5 mm.

12. The camera module as claimed in claim 4, wherein a radius of a light transmitting portion of the lens assembly is R0, a radius of an inner circumference of the mechanical structure is R1, a radius of an outer circumference of the mechanical structure is R3, an average of R1 and R3 is R2, a radius of a distal end of the lens assembly is R4, and R0<R1<R2<R3≤R4.

13. The camera module as claimed in claim 12, wherein (R3−R1)≤0.30 mm.

14. The camera module as claimed in claim 12, wherein 0.65 mm≤R2.

15. A camera module, comprising:
    a lens assembly including:
        a rigid lens configured for forming an optical image of an object, and
        a barrel disposed around the rigid lens;
    a propulsion device disposed around the lens assembly and configured for distally and proximally driving the lens assembly; and
    a deformable lens positioned distally to the lens assembly, wherein the deformable lens is deformed into a convex lens in response to a contact between the lens assembly and the deformable lens; the deformable lens remains to be a flat lens in response to no contact between the lens assembly and the deformable lens.

16. The camera module as claimed in claim 15, wherein the deformable lens comprises a liquid lens including a rigid transparent film and an elastic transparent film, both of which together form a cavity containing a liquid, wherein the cavity has a fixed volume, and the liquid has a refractive index.

17. The camera module as claimed in claim 15, wherein the barrel includes:
    a mechanical structure disposed at a distal end of the barrel and around the rigid lens, and configured for contacting the deformable lens; and
    a lateral structure disposed on a lateral side of the barrel, and configured for contacting the propulsion device.

18. A camera module, comprising:
    a lens assembly including:
        a rigid lens configured for forming an optical image of an object, and
        a barrel disposed around the rigid lens;
    a propulsion device disposed around the lens assembly and configured for distally and proximally driving the lens assembly; and
    a deformable lens positioned distally to the lens assembly, wherein the deformable lens is deformed into a convex lens in a compound focusing configuration where the lens assembly and the deformable lens contact each other; the deformable lens remains to be a flat lens in a simple focusing configuration where the lens assembly and the deformable lens do not contact each other.

19. The camera module as claimed in claim 18, wherein the deformable lens comprises a liquid lens including a rigid transparent film and an elastic transparent film, both of which together form a cavity containing a liquid, wherein the cavity has a fixed volume, and the liquid has a refractive index.

20. The camera module as claimed in claim 18, wherein the barrel includes:
   a mechanical structure disposed at a distal end of the barrel and around the rigid lens, and configured for contacting the deformable lens; and
   a lateral structure disposed on a lateral side of the barrel, and configured for contacting the propulsion device.

* * * * *